(12) United States Patent
Ellis et al.

(10) Patent No.: US 7,442,481 B2
(45) Date of Patent: Oct. 28, 2008

(54) CHARGE CONTROL AGENT

(75) Inventors: Gary Don Ellis, Proctorville, OH (US);
Rhonda Sue Bartram, Lavalette, WV (US); Edward William da Ponte, Canton, MI (US); Toshihiko Oguchi, Atsugi (JP); Timothy Alan Overway, Hamilton, MI (US); Keiki Suganami, Yokohama (JP)

(73) Assignees: XSYS Print Solutions US LLC, Huntington, WV (US); Morimura Chemicals Ltd (JP)

( * ) Notice: Subject to any disclaimer, the term of this patent is extended or adjusted under 35 U.S.C. 154(b) by 0 days.

(21) Appl. No.: 10/832,799

(22) Filed: Apr. 27, 2004

(65) Prior Publication Data

US 2005/0238983 A1 Oct. 27, 2005

(51) Int. Cl.
*G03G 9/097* (2006.01)
(52) U.S. Cl. .................. 430/108.21; 430/108.11; 430/108.14; 430/108.15; 106/494
(58) Field of Classification Search ............ 430/108.14, 430/108.21, 108.15, 108.11; 106/494
See application file for complete search history.

(56) References Cited

U.S. PATENT DOCUMENTS

| | | | |
|---|---|---|---|
| 3,274,000 A | 9/1966 | Noe et al. | |
| 3,542,544 A | 11/1970 | Seus et al. | |
| 3,652,602 A | 3/1972 | Schafer et al. | |
| 3,671,553 A | 6/1972 | Pappenfuss et al. | |
| 3,784,375 A | 1/1974 | Gilman, Jr. et al. | |
| 4,042,388 A | 8/1977 | Inoue et al. | |
| 4,061,464 A | 12/1977 | Hahnke et al. | |
| 4,448,446 A | 5/1984 | Flores | |
| 4,678,613 A | 7/1987 | Flores | |
| 4,944,806 A | 7/1990 | Sharangpani et al. | |
| 5,061,585 A | 10/1991 | Macholdt et al. | |
| 5,073,579 A * | 12/1991 | Macholdt et al. | 524/255 |
| 5,125,975 A | 6/1992 | Sharangpani et al. | |
| 5,232,804 A | 8/1993 | Molaire | |
| 5,554,722 A | 9/1996 | Eichenauer et al. | |
| 5,558,809 A | 9/1996 | Groh et al. | |
| 5,871,845 A | 2/1999 | Dahringer et al. | |
| 6,028,178 A | 2/2000 | Metz et al. | |
| 6,187,496 B1 | 2/2001 | Tanikawa et al. | |
| 6,194,115 B1 | 2/2001 | Nagase et al. | |
| 2004/0002012 A1 | 1/2004 | Pavlisko et al. | |

FOREIGN PATENT DOCUMENTS

| | | |
|---|---|---|
| DE | 37 15836 A1 | 11/1987 |
| EP | 141377 | 5/1990 |
| GB | 1180883 | 2/1970 |
| GB | 1240570 | 7/1971 |
| GB | 1454815 | 11/1976 |
| JP | 51-011455 | 1/1976 |
| JP | 52-113739 | 9/1977 |
| JP | 54-084732 | 7/1979 |
| JP | 55-079456 | 6/1980 |
| JP | 56-046248 | 4/1981 |
| JP | 58-097056 | 6/1983 |
| JP | 59-077447 | 5/1984 |
| JP | 60-024549 | 2/1985 |
| JP | 60-107654 | 6/1985 |
| JP | 61-006661 | 1/1986 |
| JP | 01-253754 | 10/1989 |
| JP | 05-113676 | 5/1993 |
| JP | 07-209913 | 8/1995 |
| JP | 08-160674 | 6/1996 |
| JP | 11-149165 | 6/1999 |
| JP | 2002-031904 | 1/2002 |

OTHER PUBLICATIONS

American Chemical Society (ACS) File Registry No. 2152-64-9 on STN, copyright 2005.*
CAS Registry No. 29243-26-3, 2002.
HCAPLUS Accession No. 2000:728552, Abstract for Journal of Imaging Science and Technology, 44(5), pp. 423-428, Carr et al., 2000.
HCAPLUS Accession No. 2001:673585, Abstract for JP2001249445, Sep. 14, 2001.
HCAPLUS Accession No. 2000:768029, Abstract for JP2000305322, Nov. 2, 2000.
HCAPLUS Accession No. 2000:532787, Abstract for JP2000214678, Aug. 4, 2000.
HCAPLUS Accession No. 2000:377095, Abstract for JP2000155462, Jun. 6, 2000.
HCAPLUS Accession No. 1999:322579, Abstract for JP11133768, May 21, 1999.
HCAPLUS Accession No. 1998:782028, Abstract for JP10319628, Dec. 4, 1998.
HCAPLUS Accession No. 1998:742725, Abstract for JP10307426, Nov. 17, 1998.
HCAPLUS Accession No. 1998:712807, Abstract for JP10293424, Nov. 4, 1998.

(Continued)

Primary Examiner—Janis L Dote
(74) Attorney, Agent, or Firm—Fish & Richardson P.C.

(57) ABSTRACT

A composition comprising a toner binder and a charge control agent comprising a sulfonation product of Solvent Blue 23, wherein from greater than 0 up to 30 mole % of the Solvent Blue 23 is sulfonated.

15 Claims, No Drawings

OTHER PUBLICATIONS

HCAPLUS Accession No. 1998:712799, Abstract for JP10293411, Nov. 4, 1998.
HCAPLUS Accession No. 1998:685274, Abstract for JP10282722, Oct. 23, 1998.
HCAPLUS Accession No. 1998:627470, Abstract for JP10254184, Sep. 25, 1998.
HCAPLUS Accession No. 1998:298248, Abstract for JP10123763, May 15, 1998.
HCAPLUS Accession No. 1997:575027, Abstract for JP09222749, Aug. 26, 1997.
HCAPLUS Accession No. 1997:315165, Abstract for JP09062037, Mar. 7, 1997.
HCAPLUS Accession No. 1997:195660, Abstract for JP09034169, Feb. 7, 1997.
HCAPLUS Accession No. 1997:76743, Abstract for JP08-286418, Nov. 1, 1996.
HCAPLUS Accession No. 1996:693859, Abstract for JP08240937, Sep. 17, 1996.
HCAPLUS Accession No. 1996:440760, Abstract for JP08113272, May 7, 1996.
HCAPLUS Accession No. 1996:337966, Abstract for JP08074163, Mar. 19, 1996.
HCAPLUS Accession No. 1994:689586, Abstract for JP06075433, Mar. 18, 1994.
HCAPLUS Accession No. 1994:667743, Abstract for JP06075432, Mar. 18, 1994.
HCAPLUS Accession No. 1994:566918, Abstract for JP06110248, Apr. 22, 1994.
HCAPLUS Accession No. 1994:231962, Abstract for JP05181318, Jul. 23, 1993.
HCAPLUS Accession No. 1993:263853, Abstract for JP04359259, Dec. 11, 1992.
CAS Registry No. 53817-30-4, 2002.
HCAPLUS Accession No. 1994:204300, Abstract for Bauer et al., Charge Control Agents for Triboelectric (Friction) Charging, Journal of Electrostatics, 30 (1993) 213-222, Elsevier.
Bauer et al., Charge Control Agents for Triboelectric (Friction) Charging, Journal of Electrostatics, 30 (1993) 213-222, Elsevier.
HCAPLUS Accession No. 2002:87376, Abstract for JP2002031904, Jan. 31, 2002.
Machine Translation of JP2002031904, Jan. 31, 2002 from JPO.
HCAPLUS Accession No. 1996:566994, Abstract for JP08160674, Jun. 21, 1996.
Machine Translation of JP08160674, Jun. 21, 1996 from JPO.
HCAPLUS Accession No. 1995:869617, Abstract for JP07209913, Aug. 11, 1995.
Machine Translation of JP07-209913, Aug. 11, 1995 from JPO.
CAS Registry No. 60518-06-01, 2002.
Derwent Accession No. 1999-380908, Abstract for JP11149165, Jun. 2, 1999.
Machine Translation of JP11149165, Jun. 2, 1999 from JPO.
Derwent Accession No. 1993-185608, Abstract for JP05113676, May 7, 1993.
Machine Translation of JP05113676, May 7, 1993 from JPO.
CAS Registry No. 4822-48-4, 2002.
Derwent Accession No. 1986-052559, Abstract for JP61006661, Jan. 13, 1986.
MARPAT Accession No. 119:213987, Abstract for US 5,232,804, Aug. 3, 1993.
Derwent Accession No. 1989-342860, Abstract for JP01253754, Oct. 11, 1989.
Derwent Accession No. 1985-071047, Abstract for JP60024549, Feb. 7, 1985.
Abstract for JP60024549, Feb. 7, 1985 from JPO.
Derwent Accession No. 1985-180340, Abstract for JP60107654, Jun. 13, 1985.
Derwent Accession No. 1984-148991, Abstract for JP59077447, May 2, 1984.
Derwent Accession No. 1983-713669, Abstract for JP58097056, Jun. 9, 1983.
Derwent Accession No. 1981-43233D, Abstract for JP56046248, Apr. 27, 1981.
Derwent Accession No. 1980-54217C, Abstract for JP55079456, Jun. 14, 1980.
Derwent Accession No. 1979-60635B, Abstract for JP54084732, Jul. 5, 1979.
Derwent Accession No. 1977-78653Y, Abstract for JP52113739, Sep. 24, 1977.
Derwent Accession No. 1976-19633X, Abstract for JP51011455, Jan. 29, 1976.
Macholdt et al., "Triboelectric Charging Properties of Organic Color Pigments", Journal of Imaging Technology, 14: 89-93 (1988).
Search Report for corresponding International Application No. PCT/US2005/013983, dated Jul. 14, 2005.

\* cited by examiner

CHARGE CONTROL AGENT

BACKGROUND OF THE INVENTION

Electrophotographic processes are used to form images on substrates. Common electrophotographic processes are photocopying and laser printing. In these processes, a latent charge image is created. A toner is applied to the image, and the image is developed and is transferred to a substrate. The substrate can be anything that accepts the image, such as paper, textiles, plastic, or foils. The image is permanently affixed to the substrate by one or more of the following methods, heat, pressure, irradiation, or exposure to solvents.

The toner generally contains a binder, a colorant, an electrostatically chargeable component, and other auxiliary compounds. Toners need to be capable of acquiring and maintaining an electrical charge to allow the toner particles to be electrostatically bound to the image area until the toner can be fixed to the substrate.

Generally, the electrical charge is imparted to the toner by means of tribo-electric charging. Tribo-electric charging is static electric charge that is built up by the motion of the particles being stirred or otherwise flowing over one another. The tribo-electric charge is normally introduced in the toner by the addition of a charge control agent, which is a material capable of building and holding a charge. Charge control agents can be azo-metal dye complexes, quaternary amine salts, polymeric salts, or triphenylmethanes. The charge control agents may me colored or colorless depending on their structure.

Solvent Blue 23 is may be used as a pigment in printing inks. Solvent Blue 23 can be sulfonated to form Pigment Blue 61, which is normally used as a pigment in printing inks. Pigment Blue 61 is a mixture of sulfonation products. In the printing ink field, Solvent Blue 23 is generally sulfonated from 50 to 100% by mole fraction of the Solvent Blue 23 to form Pigment Blue 61. For some printing ink applications, the degree of sulfonation can be as low as 30%. Sulfonation can be accomplished by the methods disclosed in U.S. Pat. No. 4,944,806 to Sharangpani et al., which is incorporated herein by reference.

Attempts have been made to use Pigment Blue 61 as a charge control agent (see U.S. Pat. No. 5,061,585 to Macholdt et al. at column 3, lines 31-52 and column 5, line 58 to column 6, line 2). Using Pigment Blue 61 at standard levels of sulfonation did not provide good results. This Pigment Blue 61 typically has a sulfonation level between 45 to 90%, and is usually 55 to 75%.

It would be desirable to have a charge control agent that provides a desired positive charge level.

SUMMARY OF THE INVENTION

The present invention relates to a composition comprising a toner binder and a charge control agent comprising a sulfonation product of Solvent Blue 23, wherein from greater than 0 up to 30 mole % of the Solvent Blue 23 is sulfonated.

DETAILED DESCRIPTION

As used throughout, ranges are used as a shorthand for describing each and every value that is within the range. Any value within the range can be selected as the terminus of the range. When used, the phrase "at least one of" refers to the selection of any one member individually or any combination of the members. The conjunction "and" or "or" can be used in the list of members, but the "at least one of" phrase is the controlling language. For example, at least one of A, B, and C is shorthand for A alone, B alone, C alone, A and B, B and C, A and C, or A and B and C.

Provided is a composition comprising a toner binder and a charge control agent. The charge control agent is a sulfonation product of Solvent Blue 23. Generally, the charge control agent is present in the composition in an amount from about 0.25 to about 5% by weight of the total toner composition, and is preferably 0.5 to 2% by weight.

Solvent Blue 23 is a generic name for a mixture of CAS 2152-64-9 (Benzenamine, N-phenyl-4-[[4-(phenylamino)phenyl][4-(phenylimino)-2,5-cyclohexadien-1-ylidene]methyl]-) and CAS 22244-16-2 (Benzenamine, 4,4"-[[4-(phenylimino)-2,5-cyclohexadien-1-ylidene]methylene]bis[N-phenyl-) and each contain the following structure:

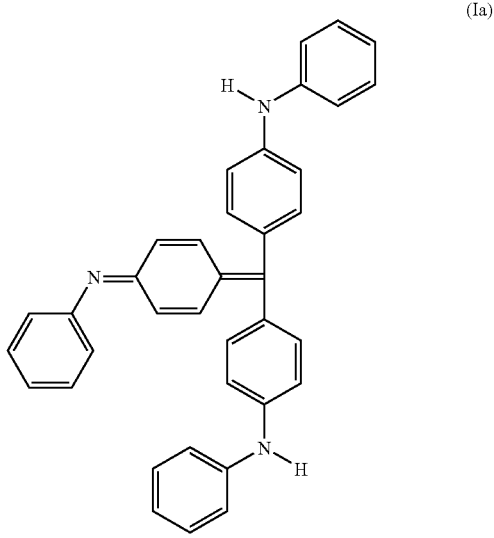

(Ia)

Additionally, Solvent Blue 23 can contain the following:

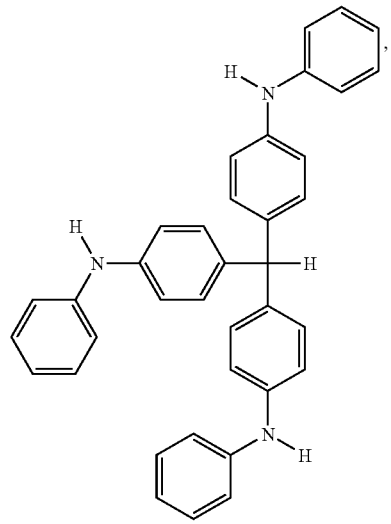
(Ib)
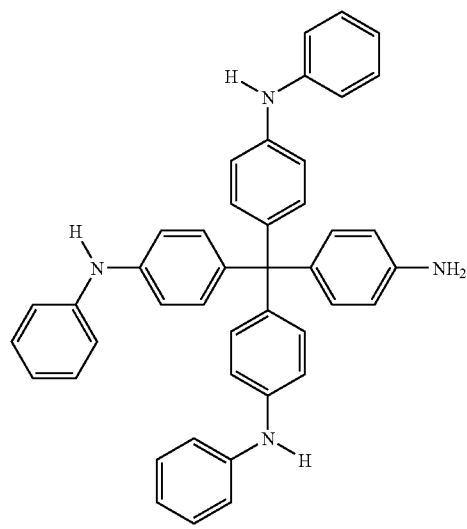
(Ic)
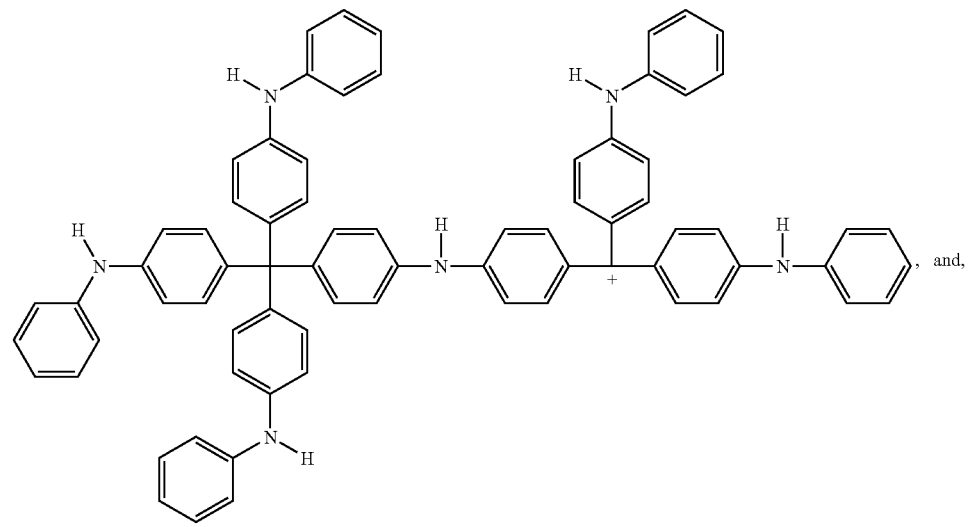
(Id)
, and,
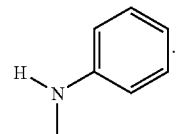
(Ie)

Materials present in the sulfonation product of Solvent Blue 23 include the following:

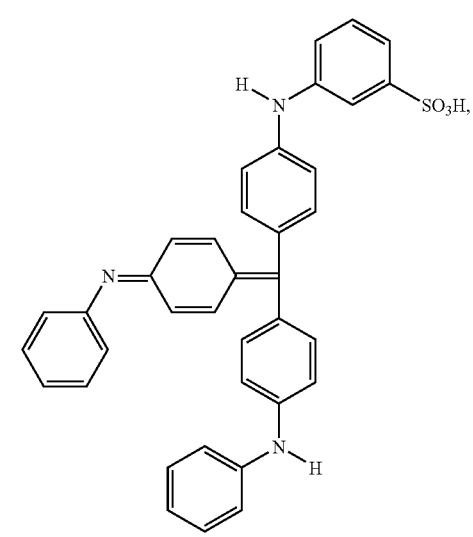

(II)

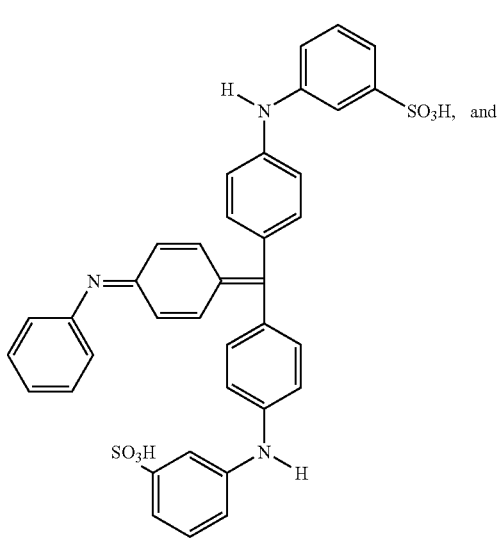

(III)

(IV)

Pigment Blue 61 is a generic name for mixture of these sulfonation products and Solvent Blue 23. The amount of (II), (III), and (IV) present in a total amount of Solvent Blue 23, (II), (III), and (IV) is from greater than 0 to 30% by mole fraction. Preferably, the amount is from 5 to 20% by mole fraction. In an amount of (II), (III), and (IV), the amount of either (III) or (IV) is preferably no more than 10% by weight. In a preferred embodiment, the amount of Solvent Blue 23 is about 85%, the amount of (II) is about 13-15%, the amount of (III) is less than about 1%, and the amount of (IV) is less than about 1% each by weight of a total amount of Solvent Blue 23, (II), (III), and (IV).

Each of the structures has a central carbon that can exist as a salt. With sulfonation, typical salts would be sulfate, bi-sulfate, hemi-sulfate, or combinations thereof. The salt could also be another salt, which includes, but is not limited to, fluoride, chloride, nitrate, tetrafluoroborate, hexafluorophosphate, or combinations thereof.

By controlling the degree of sulfonation of the Solvent Blue 23, a charge control agent is formed that has a desired level of charge capacity for a toner composition. Generally, it is desired for a charge control agent to have a charge capacity of at least about 25 µC/g. The sulfonation product of this invention can provide a charge capacity of from about 25 to about 45 µC/g, and preferably at least 30 µC/g. Charge capacity can be measured using the cascade charge measurement method listed below. Generally, charging capacities are measured at about 1% by weight loading level of charge control agent in the toner composition.

In a preferred embodiment, the charge control agent is amorphous. The mixture can have up to about 10% crystallinity as measured by X-ray diffraction.

Toner binders include any binder that is used for toner compositions. Examples of these binders include, but are not limited to, (co)polymers of vinyl aromatics, (co)polymers of (meth)acrylates, (co)polymers of (meth)acrylonitrile, (co)polymers of vinyl ketones, (co)polymers of vinyl ethers, phenol-formaldehyde resins, oil modified epoxy resins, polyurethane resins, cellulose resins, polyether resins, polyesters, and combinations thereof.

The composition can contain any additional materials that are included in toner compositions as an additive.

Cascade Charge Measurement

A styrene acrylic acid resin (such as CPR-200) is placed in a mixer containing a 1:1 (v/v) mixture of toluene/2-butanone with the styrene acrylic acid constituting 5% (w/w) of the mixture. This mixture is then stirred until the resin is fully dissolved, at which point sufficient charge control agent (CCA) is added to the mixture to represent 1% of the resin present. This is then stirred until the CCA is totally dissolved, as evidenced by the absence of any particles. A stainless steel plate is then dipped into the solution and fully coated with the resin/CCA solution. This is then allowed to air dry and then dried in a 70° C. oven for a minimum of one hour. The stainless steel plate coated with a dry matrix of styrene/acrylic acid containing 1% CCA is then mounted on a poly tetrafluoroethylene (PTFE) block at a 60° angle in a Toshiba Cascade Charge Measurement unit. A stream of ferrite beads (diameter 74-147 microns) is then allowed to cascade onto the plate at a fixed rate under the force of gravity and after five minutes the accumulated charge is measured.

SPECIFIC EMBODIMENTS OF THE INVENTION

The invention is further described in the following examples. The examples are merely illustrative and do not in any way limit the scope of the invention as described and claimed.

EXAMPLE 1

To an agitated, jacketed vessel, charged 1700 parts of 95% sulfuric acid, 170 parts of glacial acetic acid, and 30 parts of water. Cooled the mixture to 10°-20° C. and then rapidly added 440 parts of crude Solvent Blue 23. Maintained the temperature in the range of 20°-25° C. After the solids addition was completed, allowed the mixture to stir for 30-180 minutes at temperature. Applied heat to the vessel and allowed the temperature to rise to between 55° C. and 75° C. Monitored the progress of the reaction until the desired degree of sulfonation was achieved. Upon completion of the sulfonation phase, immediately quenched the reaction and isolated the product by drowning the sulfonation mass into 5000-10000 parts of 20° C. water under high turbulence conditions. Filtered and wash the product free of any residual acid or soluble organic material. The product was then dried. The product was added to a toner composition at 1% by weight of the composition and the charge capacity was measured. The charge capacity was 32 µC/gram.

EXAMPLE 2

Same as Example 1, except that 200 parts of water were used instead of 170 parts acetic acid and 30 parts water. The product was added to a toner composition at 1% by weight of the composition and the charge capacity was measured. The charge capacity was 31.5 µC/gram.

PROPHETIC EXAMPLE 3

Same as Example 1, except that butyric acid is used instead of acetic acid.

PROPHETIC EXAMPLE 4

Same as Example 1, except that propionic acid is used instead of acetic acid.

PROPHETIC EXAMPLE 5

To a vessel, add simultaneously a sulfuric acid mixture [a mixture containing 1700 parts of sulfuric cid, 170 parts of acetic acid (or propionic acid or butyric acid) and thirty parts of water] and finely ground Solvent Blue 23 in a 3.5:1 ratio. This mixture of acid and dye is then passed through a mill and into a tubular reactor operating at 60°-70° C. The reaction mixture is then quenched by drowning the sulfonation mass through a high turbulence mixing nozzle with a volume of water equal to 5000-10000 parts of 20° C. water. Filter and wash the product free of any residual acid or soluble organic material. The product is then dried.

It should be appreciated that the present invention is not limited to the specific embodiments described above, but includes variations, modifications and equivalent embodiments defined by the following claims.

What is claimed is:

1. A composition comprising a toner binder and a charge control agent comprising a sulfonation product of Solvent Blue 23, wherein from greater than 0 up to 30 mole % of the Solvent Blue 23 is sulfonated.

2. The composition of claim 1, wherein the charge control agent comprises Solvent Blue 23 and

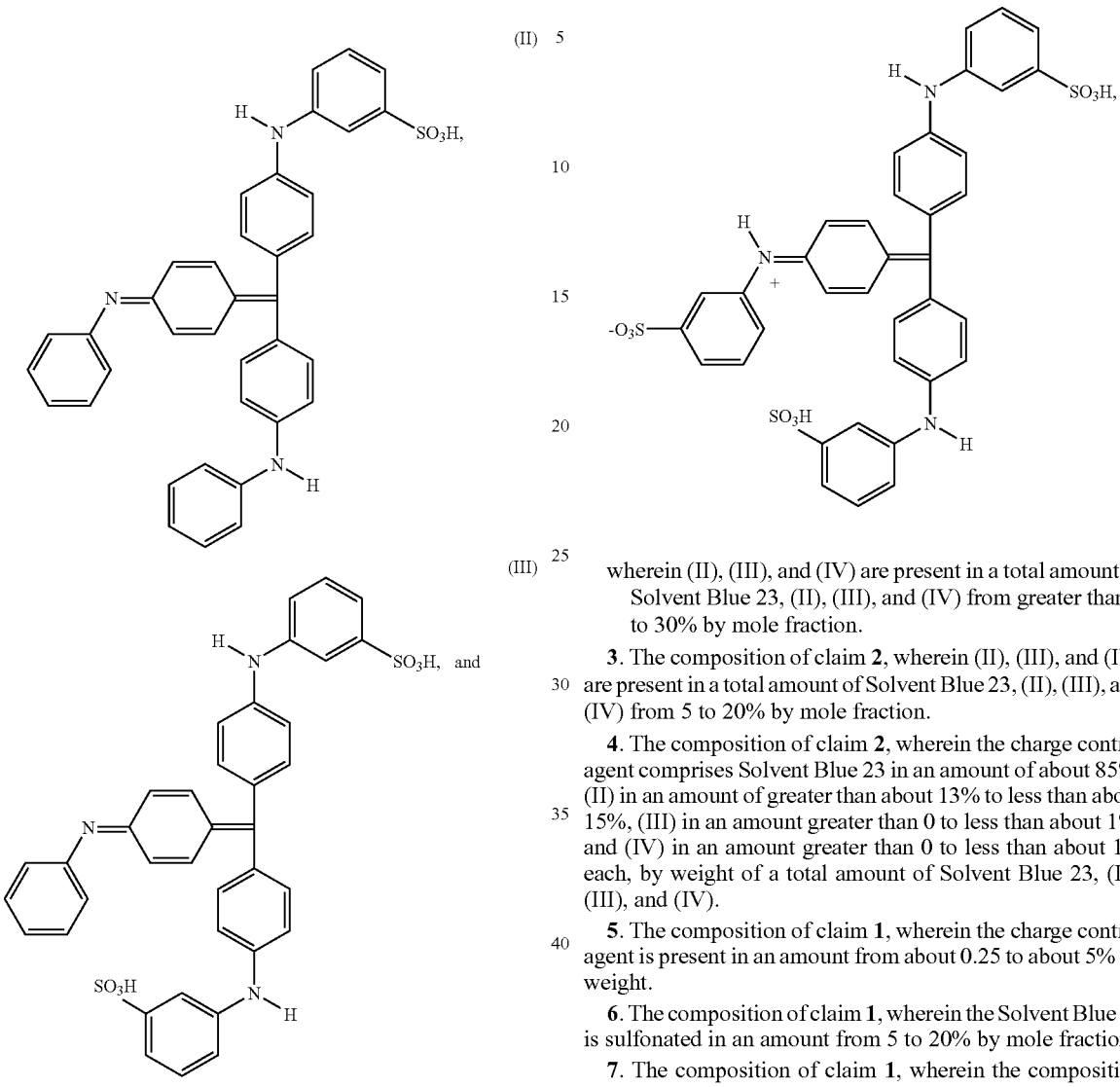

wherein (II), (III), and (IV) are present in a total amount of Solvent Blue 23, (II), (III), and (IV) from greater than 0 to 30% by mole fraction.

3. The composition of claim 2, wherein (II), (III), and (IV) are present in a total amount of Solvent Blue 23, (II), (III), and (IV) from 5 to 20% by mole fraction.

4. The composition of claim 2, wherein the charge control agent comprises Solvent Blue 23 in an amount of about 85%, (II) in an amount of greater than about 13% to less than about 15%, (III) in an amount greater than 0 to less than about 1%, and (IV) in an amount greater than 0 to less than about 1% each, by weight of a total amount of Solvent Blue 23, (II), (III), and (IV).

5. The composition of claim 1, wherein the charge control agent is present in an amount from about 0.25 to about 5% by weight.

6. The composition of claim 1, wherein the Solvent Blue 23 is sulfonated in an amount from 5 to 20% by mole fraction.

7. The composition of claim 1, wherein the composition has a charge capacity of at least 25 µC/g.

8. The composition of claim 1, wherein the composition has a charge capacity of from 25 to 45 μC/g.

9. The composition of claim 1, wherein the charge control agent is present in an amount of about 1% by weight of the composition, and the composition has a charge capacity of at least 25 μC/g.

10. The composition of claim 1, wherein the charge control agent is present in an amount of about 1% by weight of the composition, and the composition has a charge capacity of from 25 to 45 μC/g.

11. The composition of claim 1 further comprising at least one toner additive.

12. The composition of claim 1, wherein each structure in the Solvent Blue 23 has a central carbon, and the central carbon is present as a salt.

13. The composition of claim 12, wherein the salt is selected from the group consisting of sulfate, bi-sulfate, hemi-sulfate, fluoride, chloride, nitrate, tetrafluoroborate, hexaflurophosphate, and combinations thereof.

14. The composition of claim 1, wherein the charge control agent is amorphous.

15. A toner for use in an electrophotographic process, the toner comprising the composition of claim 1.

* * * * *